United States Patent Office 2,908,696
Patented Oct. 13, 1959

2,908,696

1,5-PREGNADIENES AND PROCESSES FOR THEIR MANUFACTURE

Alexander L. Nussbaum, Leonia, and Eugene P. Oliveto, Glen Ridge, N.J., assignors to Schering Corporation, Bloomfield, N.J., a corporation of New Jersey No Drawing. Application February 2, 1959
Serial No. 790,380

29 Claims. (Cl. 260—397.45)

This invention pertains to a new group of therapeutically active pregnadienes and to methods for their manufacture. In particular, our invention relates to 1,5-pregnadiene-17α,21-diol-3,20-diones which are potent antiinflammatory agents.

Our novel compounds may be represented by the following formula:

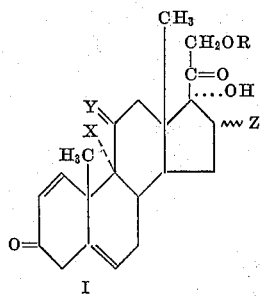

I wherein X is a member of the group consisting of hydrogen and halogen having an atomic weight less than 126; Y is a member of the group consisting of O and (H, βOH); Z is a member of the group consisting of hydrogen and an alkyl radical preferably having from 1 to 4 carbon atoms; and R is a member of the group consisting of H and acyl.

Illustrative of the 2-esters contemplated above are alkanoates such as acetate, propionate, tertiary butylacetate, cyclopentylpropionate, dimethylacetate, trimethylacetate and phenoxyacetate; aryl esters such as benzoate, thiophene carboxylate, nicotinate; esters from dibasic organic esters such as the succinate, phthalate, and the sulfobenzoate; and those from polybasic inorganic acids such as sulfate and phosphate.

Our novel compounds are prepared by subjecting a 1,4-pregnadiene or a 16-alkyl-1,4-pregnadiene possessing a halogen substituent greater than fluorine at C–6 to the action of zinc in alcohol or magnesium in ether or tetrahydrofuran. By proper control of acidity and solvent polarity, the 1,5-pregnadiene compounds are formed and isolated. Alternatively, the substituent at C–6 may be a pseudohalogen such as tosylate or mesylate or a lower alkanoyloxy group like acetoxy or propionoxy. When the reactive group in the 6-position is halogen or tosylate, the reaction towards formation of the 1,5-dienes may proceed smoothly at room temperature. With a mesylate or lower alkanoyl ester in the 6-position, higher temperatures in the range of 50–100° C. are preferred to effect the transformation since at lower temperatures the reaction proceeds quite slowly.

The C–6-substituted intermediates are prepared from 3-keto-1,4-pregnadiene starting compounds in a variety of ways. Starting compounds having a hydrogen at C–16 such as prednisone and prednisolone are well known in the art, and the 16-lower alkyl-1,4-pregnadiene starting compounds are preferably prepared as described in copending application Serial No. 733,843 of Rausser et al., filed May 8, 1958. Introduction of the halogeno, pseudohalogeno or acyloxy substituent at C–6 is carried out by any one of several methods. For example, allylic halogenation of a 3-keto-1,4-pregnadiene or a 3-keto-16-alkyl-1,4-pregnadiene with a reagent such as N-bromosuccinimide, N-bromoacetamide, N-chlorosuccinimide, bromine or chlorine in such solvents as dimethylsulfoxide or dioxane yields the corresponding 6-halogeno-1,4-pregnadiene or 6-halogeno-16-alkyl-1,4-pregnadiene. Esterification of a 6-hydroxy-1,4-pregnadiene or a 6-hydroxy-16-alkyl-1,4-pregnadiene can be made to yield the tosylate or mesylate or lower alkanoate intermediates. These 6-hydroxy-1,4-pregnadiene and 6-hydroxy-16-alkyl-1,4-pregnadiene starting compounds are prepared by subjecting a 6-desoxy-1,4-pregnadiene or a 6-desoxy-16-alkyl-1,4-pregnadiene to the microbiological oxygenating action of an organism of the genus Chaetomium according to the analogous procedure described in Belgian Patent No. 548,450.

Prior to introducing a substituent to the 6-position of a 1,4-diene so as to prepare the immediate precursor of the compounds of our invention, we prefer to esterify any reactive hydroxyl groups which may be present, such as at C–11 or C–21. Thus, for example, in the case of prednisone, the 21-esters are the preferred starting compounds. Likewise, in preparing 6-bromo-16α-methyl-prednisone for ultimate conversion into 16α-methyl-1,5-pregnadiene-17α,21-diol-3,11,20-trione, we prefer to employ a 21-ester of 16α-methylprednisone, such as the acetate, as the starting substance. In those instances where there is a hydroxyl group at C–11 such as when a prednisolone or a 16α-methylprednisolone analog is employed as a starting substance or an intermediate, the conditions required for esterification of the C–11 group of necessity esterify both the 17α- and 21-hydroxy groups as well. Thus when preparing a 6-halogeno-prednisolone or a 16α-methylprednisolone derivative for use as an immediate precursor of a compound of this invention, an 11,17,21-triester such as prednisolone triacetate or 16α-methylprednisolone-11,17,21-triacetate is employed. It is only in the particular instance where a halogenation step follows that esterification of a C–11 hydroxyl group is advisable. However, if the intermediate being prepared is an ester such as 6-alkanoate or a 6-mesylate or a 6-tosylate, then it is only necessary to protect the hydroxyl group at C–21, since the esterification at C–6 can be carried out selectively in the presence of both an 11 and 17-hydroxyl group.

It is apparent that the 16-alkyl-1,5-pregnadiene obtained will of necessity contain the original ester protective groupings. These ester groups may be conveniently hydrolyzed either chemically by the use of dilute acid or microbiologically by means of *Flavobacterium dehydrogenans* according to analogous procedures described in South African Patent No. 3462/55. The polyhydroxy-1,5-pregnadiene thus obtained may be selectively esterified at C–21 by methods well known in the art.

Alternatively, saponification of the protective ester groups may be carried out immediately after introduction of the substituent at C–6 and prior to conversion to a 1,5-diene. This process is applicable only to those methods wherein the intermediary compound contains a halogen at C–6. The saponification of the ester may be effected by means of a strong acid such as sulfonic, perchloric, or p-toluenesulfonic in aqueous alcohol. By way of example, 16α-methylprednisone is esterified to yield 16α-methylprednisone 21-acetate, whereupon bromine is introduced at C–6. The 6-bromo-16α-methylprednisone 21-acetate may be saponified to form 6-bromo-16α-methylprednisone which is then converted into the Δ¹,⁵-analog by reacting said 6-bromo-16α-methylprednisone with zinc in alcohol yielding 16α-methyl-1,5-pregnadiene-17α,21-diol-3,11,20-trione.

By means of the rearrangement process of this invention, 1,4-pregnadienes and 16-alkyl-1,4-pregnadienes substituted in positions other than those indicated in general Formula I may also be converted to the corresponding 1,5-pregnadienes. Thus, 6α-methylprednisone 21-acetate upon treatment with N-bromosuccinimide forms the 6-bromo intermediate. This latter compound when reacted with zinc in alcohol, yields 6α-methyl-17α,21-dihydroxy-1,5-pregnadiene-3,11,20-trione 21-acetate. 1,5-pregnadienes may also be prepared from other substituted 1,4-pregnadienes such as 6α-methylprednisolone, 6α-methyl-9α-fluoroprednisolone, 2-methylprednisolone, 9α,21-difluoro-21-desoxyprednisolone, 16α-hydroxyprednisolone and 16α-hydroxy-9α-fluoroprednisolone in an analogous manner.

The process of our invention whereby a 4,5-double bond rearranges to a 5,6-double bond is applicable not only to 1,4-pregnadienes but to any steroid containing a 3-keto-$\Delta^4$-configuration. Thus any pregnane, androstane, saponin, sapogenin or bile acid containing a 3-keto-$\Delta^4$-moiety which will form a 6-substituted derivative such as the 6-halogeno-, 6-tosylate-, 6-mesylate-, or 6-acylate-, a requisite intermediary starting compound, will form the corresponding 3-keto-$\Delta^5$-product when said 6-substituted intermediate is treated with an agent such as zinc in ethanol. Derivatives of 4-pregnenes such as cortisone, hydrocortisone, progesterone, 19-norprogesterone as well as 11-dehydroprogesterone, and the like, are thus transformed to their corresponding $\Delta^5$-pregnenes. Androstanes such as $\Delta^{1,4}$-androstadiene-17β-ol-3-one, testosterone, $\Delta^{1,4}$-androstadiene-3,17-dione, $\Delta^4$-androstene, and the like are converted to the $\Delta^5$-androstenes.

The new 1,5-pregnadienes and 16-alkyl-1,5-pregnadienes of our invention falling within Formula I are anti-inflammatory agents useful in alleviating conditions such as rheumatoid arthritis, intractable asthma, rheumatic fever, disseminate lupus erythematosus; skin ailments such as extensive atopic dermatoses, as well as certain inflammatory disorders of the eye. Our 1,5-pregnadienes advantageously do not possess many undesirable side effects which often accompany the use of cortical hormones. For example, 1,5-pregnadiene-17α,21-diol-3,11,20-trione is 3 to 4 times as active as cortisone as an anti-inflammatory agent in alleviating arthritis, said diene having potency in the order of that possessed by prednisone. The 1,5-diene, when administered to a patient even at twice the effective dose of prednisone, advantageously exhibits less nitrogen, calcium and phosphorous loss, less sodium and water retention, as well as less increase in fasting blood sugar as occurs with prednisone administration. We also have discovered that the introduction of the 16-alkyl group into a 1,5-diene completely eliminates the residual salt and water retaining properties of the substance, while simultaneously retaining the other advantageous properties, i.e. lower nitrogen, calcium and phosphorous loss and less increase in fasting blood sugar. Thus, since our novel compounds exhibit little or no water or sodium retention, they may be taken in large doses if necessary, providing for anti-inflammatory action without being concerned with edematous effect.

Our therapeutically valuable compounds are preferably administered orally in the form of tablets containing, for example about 2 to 25 mg. per tablet mixed with a solid carrier containing one or more of the usual excipients such as starch, sugar, gums, soaps, clays and the like. Where parenteral administration is indicated, subcutaneous or intramuscular injection of a 21-lower alkanoyl ester dissolved or suspended in a suitable non-toxic liquid vehicle is preferred. In the treatment of skin conditions such as atopic dermatoses, topical preparations such as containing 2–5% of active ingredient are advantageously employed. In some instances, such as direct treatment of an inflammed joint, crystalline suspensions are injected intra-articularly. These microcrystalline suspensions are adaptable for use in nasal sprays as well.

In addition to being active anti-inflammatories themselves, the new compounds of our invention are useful intermediates in the production of new classes of physiologically active corticoids, indicated below as III, IV, and V, these latter compounds being potent long acting anti-inflammatory agents devoid of side effects such as gastric irritation, salt and water retention and "moon face."

Methods of utilizing our compounds as intermediates are illustrated by the reactions outlined below wherein X, Y, R and Z have the meanings previously given.

Epoxidation of the 3-keto-$\Delta^{1,5}$-dienes with peracids such as peracetic, perbenzoic, and the like, produces 5α,6α-epoxy-3-keto-$\Delta^1$-steroids (II) which, on treatment with hydrohalic acids, yields $\Delta^1$-3-keto-5α-hydroxy-6β-halosteroids as exemplified by III. Dehydration of III with acetic acid, for example, produces 6β-fluoro-$\Delta^{1,4}$-diene-3-ones (IV). Dehalogenation of the 6β-bromo derivatives, III, with a reactant such as zinc in ethanol, chromous chloride, or Raney nickel gives 5α-hydroxy-$\Delta^1$-3-keto steroids (V).

Similarly, any $\Delta^5$-3-keto steroids may undergo the above indicated transformations to form derivatives analogous to III, IV, and V.

Some of the physiologically active compounds which have been made as indicated above are as follows. 5α-hydroxy-6-halogeno compounds of the type represented by Formula III are 6β - fluoro - 5α,17α,21 - trihydroxy - 1 - pregnene - 3,11,20 - trione, 6β - fluoro - 5α,11β,17α,21 - tetrahydroxy - 1 - pregnene - 3,20 - dione, 6β,9α - difluoro - 5α,17α,21 - trihydroxy - 1 - pregnene - 3,11,20 - trione, 6β,9α - difluoro - 5α,11β,17α,21 - tetrahydroxy - 1 - pregnene - 3,20 - dione and 6β - fluoro - 6α - methyl - 5α,17α,21 - trihydroxy - 1 - pregnene - 3,11,20- trione and the 16-methyl analogs of the foregoing.

Active corticosteroids of the type represented by Formula IV are 6β-fluoroprednisone and 21-acetate, 6β-fluoroprednisolone and 21-acetate, 6β,9α-difluoroprednisone and 21-acetate, 6β,9α-difluoroprednisolone and 21-acetate, 6α-methyl-6β-fluoroprednisone and 21-acetate, 6α-methyl-6β-fluoroprednisolone and 21-acetate, 6β-fluoro-16-methylprednisones and their 21-acetates, 6β-fluoro-16-methylprednisolones and their 21-acetates, 6β,9α-difluoro-16α-hydroxyprednisone and 16,21-diacetate, and 6β,9α-difluoro-16α-hydroxyprednisolone and 16,21-diacetate.

Some valuable compounds of the type represented by Formula V are 5α,17α,21 - trihydroxy - 1 - pregnene - 3,11,20 - trione, 5α,11β,17α,21 - tetrahydroxy - 1 - pregnene - 3,20 - dione, 9α - fluoro - 5α,17α,21 - trihydroxy - 1 - pregnene - 3,11,20 - trione, 9α - fluoro - 5α,11β,17α,21 - tetrahydroxy - 1 - pregnene - 3,20 - dione, 6α - methyl - 5α,17α,21 - trihydroxy - 1 - pregnene - 3,11,20 - trione, 6α - methyl - 5α,11β,17α,21 - tetrahydroxy - 1 - pregnene - 3,20 - dione, 16 - methyl - 5α,17α,21 - trihydroxy - 1 - pregnene - 3,11,20 - triones, 16 - methyl - 5α,11β,17α,-21 - tetrahydroxy - 1 - pregnene - 3,20 - diones, 9α - fluoro - 5α,16α,17α,21 - tetrahydroxy - 1 - pregnene - 3,11,20 - trione, and 9α - fluoro - 5α,11β,16α,17α,21 - pentahydroxy - 1 - pregnene - 3,20 - dione.

All the compounds of our invention are valuable therapeutic agents as outlined above. The preferred embodiment of our invention, however, are the 9α-fluoro analogs of the 1,5-pregnadienes falling within Formula I, and particularly the 9α-fluoro analogs of the 16-methyl-1,5-pregnadienes.

The present invention is a continuation-in-part of our co-pending applications Serial No. 725,521, filed April 1, 1958, and Serial No. 770,315, filed October 29, 1958.

The following examples are illustrative of the procedure employed in preparing the compounds of this invention, but are not to be construed as limiting the scope thereof; the scope of our invention being limited only by the appended claims.

EXAMPLE 1

*17α,21-dihydroxy-1,5-pregnadiene-3,11,20-trione 21-acetate*

A. 6β - bromo - 17α,21 - dihydroxy - 1,4 - pregnadiene - 3,11,20-trione 21-acetate (500 mg.) is dissolved in 150 ml. of absolute alcohol, then 25 ml. of water and 5 g. of zinc powder are added. The suspension is stirred at room temperature for 8 hours, after which time the zinc is filtered, and the filtrate concentrated to dryness in vacuo. The resulting residue is recrystallized from acetone to yield 312 mg. of 17α,21-dihydroxy-1,5-pregnadiene-3,11,20-trione 21-acetate, M.P. 214–218° C., $$\epsilon_{224}^{MeOH} = 13,000$$

$[\alpha]_D^{25} = +138.4$ (dioxane).

*Analysis.*—Calcd. for $C_{26}H_{34}O_7$: C, 68.10; H, 7.47. Found: C, 67.87; H, 7.39.

B. Alternatively, the compound of this example may be prepared as follows. 6β,17α,21-trihydroxy-1,4-pregnadiene-3,11,20-trione 6,21-diacetate (500 mg.) is dissolved in 150 ml. of absolute ethyl alcohol, then 25 ml. of water and 5 g. of zinc powder are added. The suspension is stirred for one hour at 90° C., after which the solution is cooled, the zinc filtered, and the filtrate concentrated to dryness in vacuo. The resulting residue is recrystallized from acetone to yield 17α,21-dihydroxy-1,5 - pregnadiene - 3,11,20 - trione 21-acetate, M.P. 214–218° C.

EXAMPLE 2

*17α,21-dihydroxy-1,5-pregnadiene-3,11,20-trione*

The 1,5-pregadiene 21-acetate prepared in Example 1 is hydrolyzed to the corresponding 21-hydroxy compound with the aid of a culture of *Flavobacterium dehydrogenans* (Rutgers University Collection No. 130).

A. The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Gm. |
|---|---|
| Yeast extract (Difco) | 10 |
| Potassium phosphate monobasic | 4.48 |
| Sodium phosphate dibasic | 4.68 |
| Tap water to 1 liter. | |

This culture medium has previously been autoclaved, as at 15 lbs. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 17α,21-dihydroxy-1,5-pregnadiene-3,11,20-trione 21-acetate dissolved in a minimum volume of ethanol. The reaction mixtures are then shaken at 30° C. for 12 to 72 hours. The reaction is stopped when paper chromatography indicates that the starting material has been transformed.

The contents of the flasks are combined and extracted with methylene chloride. The extracts are concentrated and the residue is crystallized from acetone-hexane affording 0.62 g. of 17α,21-dihydroxy-1,5-pregnadiene-3,11,20-trione as a crystalline solid.

Alternatively, the compound of this example may be prepared by the following procedures B and C.

B. *6β - bromo - 17α,21 - dihydroxy - 1,4 - pregnadiene - 3,11,20-trione.*—6β - bromo - 17α,21 - dihydroxy-1,4-pregnadiene-3,11,20-trione 21-acetate (500 mg.) is dissolved in 25 ml. of absolute methanol and 5 ml. of water. p-Toluenesulfonic acid (100 mg.) is added and the resulting reaction mixture allowed to stand overnight at room temperature. The alcohol is then evaporated in vacuo, water added to the residue, and the resulting precipitate filtered and dried at room temperature. Recrystallization of this solid from acetone-hexane gives 6β-bromo-17α,21-dihydroxy-1,4-pregnadiene-3,11,20-trione.

C. *17α,21-dihydroxy-1,5-pregnadiene-3,11,20-trione.* — 6β - bromo- 17α,21- dihydroxy-1,4 - pregnadiene - 3,11,20-trione (500 mg.), prepared as in above Example 2B, is reacted with zinc in ethanol and water in the manner of Example 1A to yield 17α,21-dihydroxy-1,5-pregnadiene-3,11,20-trione.

EXAMPLE 3

*9α-fluoro-17α,21-dihydroxy-1,5-pregnadiene-3,11,20-trione 21-acetate*

9α-fluoro-6β-bromo-17α,21-dihydroxy-1,4-pregnadiene-3,-11,20-trione 21-acetate is reacted with zinc, ethanol and water in the manner described in Example 1A, to yield 9α-fluoro-17α,21-dihydroxy-1,5-pregnadiene-3,11,20-trione 21-acetate which is crystallized from ethyl acetate.

Alternatively, the compound of this sample may be prepared as follows:

6β-bromo-9α-fluoro-17α,21-dihydroxy-1,4-pregnadiene-3,11,20-trione 21-acetate (500 mg.) is dissolved in 10 ml. of tetrahydrofuran, and 4 g. of magnesium turnings added. After refluxing this reaction mixture for one hour, it is cooled to room temperature, and 25 ml. of a 5% aqueous ammonium sulfate solution added. After stirring this mixture an hour, chloroform is added, and the organic solvent layer separated from the aqueous layer. The chloroform solution is concentrated in vacuo to yield 9α-fluoro- 17α,21- dihydroxy-1,5- pregnadiene- 3,11,20- trione 21-acetate.

In similar fashion, other new compounds of this invention as represented by Examples 1–9 may be prepared using magnesium in an inert solvent such as ether or tetrahydrofuran.

The term inert solvent as used in this application is defined as an organic solvent which itself does not react or enter into the reactions described.

EXAMPLE 4

9α-fluroro-17α,21-dihydroxy-1,5-pregnadiene-3,11,20-trione

The 9α-fluoro-1,5-pregnadiene 21-acetate of Example 3 is subjected to a culture of *Flavobacterium dehydrogenans* in the manner of Example 2 to give 9α-fluoro-17α,21-dihydroxy-1,5-pregnadiene-3,11,20-trione.

EXAMPLE 5

11β,17α,21-trihydroxy-1,5-pregnadiene-3,20-dione

A. *6β-bromo-11β,17α,21-trihydroxy - 1,4 - pregnadiene-3,20-dione triacetate.*—To 11β,17α,21-trihydroxy-1,4-pregnadiene-3,20-dione triacetate (5.2 g.) dissolved in 1500 ml. of carbon tetrachloride there is added 2.53 g. of N-bromosuccinimide and 0.075 g. of benzoyl peroxide, and the mixture is refluxed with illumination (immersed bulb RFL No. 2) for 30 minutes. After slightly cooling the reaction mixture, water is added and the organic layer separated and concentrated to an oily residue of 6β-bromo-11β,17α,21-trihydroxy-1,4-pregnadiene triacetate used without further purification in the following reaction.

B. *11β,17α,21- trihydroxy- 1,5- pregnadiene-3,20- dione triacetate.*—6β-bromo-11β,17α,21- trihydroxy-1,4- pregnadiene-3,20-dione triacete (200 mg.) is dissolved in 70 ml. of absolute methyl alcohol then 10 ml. of water and 2 g. of zinc powder are added. After the suspension is stirred at room temperature for seven hours, the zinc is filtered, and the filtrate concentrated to a crystalline residue which is recrystallized from ether to yield 11β,17α,21-trihydroxy-1,5-pregnadiene-3,20-dione triacetate, M.P. 155–160° C., $$\epsilon_{224}^{CH_3OH} = 13,200$$

C. *11β,17α,21 - trihydroxy - 1,5 - pregnadiene - 3,20-dione.*—The 1,5-pregnadiene-triacetate prepared in above Example 5B is subjected to the action of a culture of *Flavobacterium dehydrogenans* in the manner of Example 2 to yield 11β,17α,21-trihydroxy-1,5-pregnadiene-3,20-dione which may be recrystallized from methanol.

Alternatively, the compound of this example may be prepared as described in following procedures D and E.

D. *6β,11β,17α,21 - tetrahydroxy - 1,4 - pregnadiene-3,20-dione 6-methanesulfonate 21-acetate.*—100 mg. of 6β,11β,17α,21 - tetrahydroxy - 1,4 - pregnadiene - 3,20-dione 21-acetate (prepared as described in Belgium Patent No. 548,450) is dissolved in 0.4 ml. of methylene chloride and 0.4 ml. of pyridine. The solution is cooled to 0° C., 1.6 ml. of methanesulfonyl chloride added, and the mixture stirred for 2 hours at 0° C., then left overnight at room temperature. The reaction mixture is then poured into water, the resulting precipitate which is filtered and air dried is 6β,11β,17α,21-tetrahydroxy-1,4-pregnadiene-3,20-dione 6-methanesulfonate 21-acetate.

E. *11β,17α,21 - trihydroxy - 1,5 - pregnadiene - 3,20-dione.*—The 6 - methanesulfonate - 1,4 - pregnadiene (55 mg.) of above Example 5D is dissolved in 20 ml. of ethanol and 1 ml. of water. Zinc filings (100 mg.) are added, and the suspension stirred for 1 hour at 90° C. The solution is cooled, the zinc filtered, and the resulting filtrate concentrated to a residue substantially of 11β,17α, 21-trihydroxy-1,5-pregnadiene-3,20-dione 21-acetate.

This 21-acetate residue is hydrolyzed in the manner of Example 5C to yield 11β,17α,21-trihydroxy-1,5-pregnadiene-3,20-dione.

A third alternative procedure of preparing the compound of this example is given below.

F. *11β,17α,21 - trihydroxy - 1,5 - pregnadiene - 3,20-dione 21 - acetate.*—6β,11β,17α,21-tetrahydroxy-1,4-pregnadiene-3,20-dione 6-p-toluenesulfonate 21-acetate (Belgium Patent No. 548,450) as a starting compound is reacted with zinc powder at room temperature in the manner described in Example 1A to obtain 11β,17α,21-trihydroxy-1,5-pregnadiene-3,20-dione 21-acetate.

This 21-acetate is hydrolyzed in the manner of Example 2 to yield 11β,17α,21-trihydroxy-1,5-pregnadiene-3,20-dione.

A fourth alternative for the preparation of this example is described in procedures G and H.

G. *6β - bromo - 11β,17α,21 - trihydroxy - 1,4 - pregnadiene - 3,20 - dione.*—6β - bromo - 11β,17α,21 - trihydroxy-1,4-pregnadiene triacetate prepared as in Example 5A, is subjected to the action of a culture of *Flavobacterium dehydrogenans* in the manner of Example 2 to yield 6β-bromo-11β,17α,21-trihydroxy-1,4-pregnadiene-3,20-dione.

H. *11β,17α,21 - trihydroxy - 1,5 - pregnadiene - 3,20-dione.*—The 6β-bromo-11β,17α,21-trihydroxy-1,4-pregnadiene-3,20-dione of above Example 5G is reacted with zinc and propyl alcohol in the manner of Example 1A to yield 11β,17α,21 - trihydroxy - 1,5 - pregnadiene - 3,20-dione.

A fifth alternative for the preparation of this example is described in the following procedure I.

I. *6β,11β,17α,21 - tetrahydroxy - 1,4 - pregnadiene-3,20-dione.*—6,21-diacetate (prepared as described in Belgium Patent No. 548,450) is reacted with zinc in ethanol in the manner described in Example 1A to yield 11β,17α,21 - trihydroxy-1,5-pregnadiene - 3,20 - dione 21-acetate.

A sixth alternative procedure is described in procedures J and K.

J. *6β - bromo - 11β,17α,21 - trihydroxy - 1,4 - pregnadiene - 3,20 - dione 21 - acetate.*—11β,17α,21 - trihydroxy-1,4-pregnadiene-3,20-dione 21-acetate (1 g.) is suspended in 10 ml. of dioxane and 5 ml. of acetic acid. To this, bromine (2.5 g.) dissolved in acetic acid (5 ml.) is added, and the resulting orange solution allowed to stand at room temperature for one hour. About 100 ml. of ice-water is then added. The resulting precipitate of 6β-bromo-11β,17α,21 - trihydroxy - 1,4 - pregnadiene - 3,20 - dione 21-acetate $$\left(\epsilon_{243}^{CH_3OH}\right)$$

is filtered and used in this state of purity in procedure K.

K. *11β,17α,21 - trihydroxy - 1,5 - pregnadiene - 3,20-dione 21-acetate.*—The 6β - bromo - 11β,17α,21 - trihydroxy-1,4-pregnadiene-3,20-dione 21-acetate prepared in above procedure 5J is dissolved in ethanol (300 ml.) and water (50 ml.), and 10 g. of zinc powder added. The resulting suspension is refluxed for 30 minutes, then cooled and filtered. The filtrate is concentrated to dryness in vacuo and chromatographed over 30 g. of Florisil. The fractions eluted with benzene-ether (3:1) are recrystallized from methylene chloride-ether to give 11β,17α,21- trihydroxy-1,5-pregnadiene-3,20 - dione 21 - acetate, M.P. 219–224° C., $$\epsilon_{224}^{CH_3OH} = 12{,}500$$

EXAMPLE 6

*9α-fluoro-11β,17α,21-trihydroxy-1,5-pregnadiene-3,20-dione*

6β - bromo - 9α - fluoro - 11β,17α,21 trihydroxy - 1,5-pregnadiene-3,20-dione triacetate is treated with zinc powder and methyl alcohol in the manner of Example 5B to give 9α-fluoro-11β,17α,21-trihydroxy-1,5-pregnadiene-3,20-dione triacetate.

The above triacetate of this example is subjected to the action of a culture of *Flavorbacterium dehydrogenans* in the manner of Example 2 to yield 9α-fluoro-11β,17α,21-trihydroxy-1,5-pregnadiene-3,20-dione.

One gram of the trihydroxy-1,5-pregnadiene of this example is dissolved in 5 ml. of acetic anhydride, kept at 40° C. for 2 hours, and then poured into ice water. The resulting precipitate is filtered, air dried, and recrystallized from methanol to yield 9α-fluoro-11β,17α,21-trihydroxy-1,5-pregnadiene-3,20-dione 21-acetate.

EXAMPLE 7

*9α-bromo-17α-21-dihydroxy-1,5-pregnadiene-3,11,20-trione 21-acetate*

A. *6β,9α - dibromo - 17α,21 - dihydroxy - 1,4 - pregnadiene - 3,11,20 - trione 21 - acetate.*—9α - bromo - 17α,21-dihydroxy-1,4-pregnadiene - 3,11,20 - trione 21-acetate (1 g.) is dissolved in 200 ml. of chlorobenzene and 225 ml. of carbon tetrachloride, then 25 ml. of solvent distilled under argon to remove any traces of moisture. N-bromosuccinimide (0.53 g.) is added, and the solution strongly illuminated with an immersed bulb RFL No. 2 while the solution is heated and refluxed for 15 minutes. The reaction mixture is then cooled, poured into methylene chloride and washed with water. The organic layer is dried over magnesium sulfate, filtered, and concentrated to an oily residue of 6β,9α-dibromo-17α,21-dihydroxy-1,4-pregnadiene-3,11,20-trione 21-acetate. The oily 6-bromide thus obtained, is used without further purification in the subsequent reaction.

B. *9α - bromo - 17α,21 - dihydroxy - 1,5 -pregnadiene-3,11,20-trione 21-acetate.*—The oily 6-bromide of above Example 7A is reacted with zinc in ethanol in the manner of Example 1. The product isolated is crystallized from acetone to yield 9α-bromo-17α,21-dihydroxy-1,5-pregnadiene-3,11,20-trione 21-acetate.

By subjecting the 21-acetate of this example to the action of *Flavorbacterium dehydrogenans* as described in Example 2 there is obtained 9α-bromo-17α,21-dihydroxy-1,5-pregnadiene-3,11,20-trione.

EXAMPLE 8

*17α,21-dihydroxy-1,5-pregnadiene-3,11,20-trione 21-isobutyrate*

A. *6β - bromo - 17α,21 - dihydroxy - 1,4 - pregnadiene-3,11,20 - trione 21 - isobutyrate.*—17α,21 - dihydroxy-1,4-pregnadiene-3,11,20-trione 21-isobutyrate (1.1) is reacted with N-bromosuccinimide (0.6 g.) in the manner of Example 7A to yield 6β-bromo-17α,21-dihydroxy-1,4-pregnadiene-3,11,20-trione 21-isobutyrate as an oily residue.

B. *17α,21-dihydroxy-1,5-pregnadiene-3,11,20-trione 21-isobutyrate.*—The oily 6-bromo-1,4-pregnadiene of above Example 8A is reacted with zinc powder (15 g.), ethanol (500 ml.) and water (80 ml.) in the manner of Example 1 to yield 0.74 g. of 17α,21-dihydroxy-1,5-pregnadiene-3,11,20-trione 21-isobutyrate.

The 1,5-pregnadiene 21-isobutyrate of this example is hydrolyzed to the corresponding 21-hydroxy-1,5-pregnadiene with the aid of a culture of *Flavobacterium dehydrogenans* in the manner of Example 2.

EXAMPLE 9

*9α-chloro-17α,21-dihydroxy-1,5-pregnadiene-3,11,20-trione*

9α-chloro-17α,21-dihydroxy -1,4 - pregnadiene - 3,11,20-trione 21-acetate is reacted with N-bromosuccinimide in the manner of Example 7A to yield 6β-bromo-9α-chloro-17α,21-dihydroxy-1,4-pregnadiene-3,11,20-trione 21-acetate as an oily residue.

This oily 6β-bromide is reacted with zinc in ethanol in the manner of Example 1A to give 9α-chloro-17α,21-dihydroxy-1,5-pregnadiene-3,11,20-trione 21-acetate.

This 21-acetate is hydrolyzed to the corresponding 21-alcohol in the manner of Example 2 to yield 9α-chloro-17α,21-dihydroxy-1,5-pregnadiene-3,11,20-trione.

EXAMPLE 10

*9α-fluoro-16α-methyl-11β,17α,21-trihydroxy-1,5-pregnadiene-3,20-dione 21-acetate*

A. *6β-bromo-9α - fluoro-16α - methyl -11β,17α,21-trihydroxy-1,4-pregnadiene-3,20-dione 21-acetate.*—The requisite starting material, 9α-fluoro-16α-methyl-11β,17α,21-trihydroxy-1,4-pregnadiene-3,20-dione 21-acetate, is prepared by the process described in co-pending application Serial No. 733,843 of Rausser et al., filed May 8, 1958.

9α - fluoro - 16α - methyl - 11β,17α,21 - trihydroxy - 1,4-pregnadiene-3,20-dione 21-acetate (380 mg.) is dissolved in 45 ml. of dioxane and then 165 mg. of bromine in 20 ml. of dioxane is added to the stirred solution at room temperature. After the color is completely discharged, agitation is continued for another ten minutes before pouring the solution into 500 ml. of ice-water. The precipitate which thus forms is filtered and air dried, and is substantially 6β-bromo-9α-fluoro-16α-methyl-11β,17α,21-trihydroxy-1,4-pregnadiene-3,20-dione 21-acetate. This product is used without further purification in the following procedure.

B. *9α-fluoro-16α-methyl - 11β,17α,21 - trihydroxy - 1,5-pregnadiene-3,20-dione 21-acetate.*—6β-bromo-9α-fluoro-16α - methyl -11β,17α,21-trihydroxy-1,4-pregnadiene-3,20-dione 21-acetate, prepared in above Example 10A, is dissolved in 100 ml. of ethanol to which 15 ml. of water is added and the resulting solution is heated to reflux temperature. Zinc powder (1.5 g.) is then added and the refluxing suspension is stirred for 1.5 hours, cooled and filtered. The filtrate is concentrated to dryness in vacuo, and chromatographed over 30 g. of Florisil. The fractions eluted with benzene-ether (3:1) give 9α-fluoro-16α - methyl -11β,17α,21-trihydroxy-1,5-pregnadiene-3,20-dione 21-acetate.

EXAMPLE 11

*9α-fluoro-16α-methyl-11β,17α,21-trihydroxy-1,5-pregnadiene-3,20-dione*

The 16α-methyl-1,5-pregnadiene 21-acetate prepared in above Example 10 is hydrolyzed to the corresponding 21-hydroxy compound with the aid of a culture of *Flavobacterium dehydrogenans* in the manner described in Example 2. The product is isolated and purified in the described manner to give 9α-fluoro-16α-methyl-11β,17α,21-trihydroxy-1,5-pregnadiene-3,20-dione.

EXAMPLE 12

*9α-fluoro-16β-methyl-11β,17α,21-trihydroxy-1,5-pregnadiene-3,20-dione 21-acetate*

A. *6β - bromo - 9α - fluoro - 16β - methyl - 11β,17α,21-trihydroxy -1,4 - pregnadiene-3,20-dione 21-acetate.*—The requisite intermediate, 9α-fluoro-16β-methyl-11β,17α,21-trihydroxy-1,4-pregnadiene-3,20-dione 21-acetate, is prepared by the process described in co-pending application Serial No. 733,843 of Rausser et al., filed May 8, 1958.

9α - fluoro - 16β - methyl - 11β,17α,21 - trihydroxy-1,4-pregnadiene-3,20-dione 21-acetate (380 mg.) is brominated and the resulting product isolated in the manner described in Example 10A to give 6β-bromo-9α-fluoro- 16β-methyl-11β,17α,21-trihydroxy-1,4-pregnadiene-3,20-dione 21-acetate.

B. *9α-fluoro-16β-methyl-11β,17α,21-trihydroxy-1,5-pregnadiene-3,20-dione 21-acetate.*—The 6β-bromo-9α-fluoro-16β-methyl-1,4-pregnadiene of above Example 12A is reacted with zinc powder is ethanol-water in the manner of Example 10B, and the resulting product purified in the described manner to give 9α-fluoro-16β-methyl-11β,17α,21-trihydroxy-1,5-pregnadiene-3,20-dione 21-acetate.

EXAMPLE 13

*9α-fluoro-16β-methyl-11β,17α,21-trihydroxy-1,5-pregnadiene-3,20-dione*

The 16β-methyl-1,5-pregnadiene 21-acetate of above Example 12 is converted to the corresponding 21-alcohol with the aid of a culture of *Flavobacterium dehydrogenans* in the manner described in Example 2 yielding 9α-fluoro-16β-methyl-11β,17α,21-trihydroxy-1,5-pregnadiene-3,20-dione.

Alternatively, the 16β-methyl-11β,17α,21-trihydroxy-1,5-pregnadiene of this example may be prepared as follows:

507 mg. of 6β-bromo-9α-fluoro-16α-methyl-11β,17α,21-trihydroxy-1,4-pregnadiene-3,20-dione 21-acetate (prepared as in Example 10A) is dissolved in 25 ml. of ice-cold ethanol containing 2.5 ml. of water and 65 mg. of sodium hydroxide. The solution is stirred under nitrogen at 0° C. for 15 minutes, then neutralized with acetic acid and concentrated in vacuo almost to dryness to yield a residue of substantially 6β-bromo-9α-fluoro-16β-methyl-11β,17α,21-trihydroxy-1,4-pregnadiene-3,20-dione. To this 6β-bromo residue there is added ice-water and ethanol and the solution is reacted with zinc in the manner of Example 10B to give 9α-fluoro-16β-methyl-11β,17α,21-trihydroxy-1,5-pregnadiene-3,20-dione.

EXAMPLE 14

*9α-chloro-16α-methyl-11β,17α,21-trihydroxy-1,5-pregnadiene-3,20-dione*

A. *6β-bromo-9α-chloro-16α-methyl-11β,17α,21-trihydroxy-1,4-pregnadiene-3,20-dione 21-acetate.*—The requisite intermediate, 9α-chloro-16α-methyl-11β,17α-21-trihydroxy-1,4-pregnadiene-3,20-dione 21-acetate, is prepared in the manner described in co-pending application Serial No. 733,843, of Rausser et al., filed May 8, 1958.

9α-chloro-16α-methyl-11β,17α,21-trihydroxy-1,4-pregnadiene-3,20-dione 21-acetate is brominated, and the resulting product isolated, in the manner of Example 10A to give 6β-bromo-9α-chloro-16α-methyl-11β-17a,21-trihydroxy-1,4-pregnadiene-3,20-dione 21-acetate.

B. *9α-chloro-16α-methyl-11β,17α,21-trihydroxy-1,5-pregnadiene-3,20-dione 21-acetate.*—The 6β-bromo-pregnadiene of above Example 14A is reacted with zinc and aqueous ethanol in the manner of Example 10B, and the resulting product isolated to give 9α-chloro-16α-methyl-11β,17α,21-trihydroxy-1,5-pregnadiene-3,20-dione 21-acetate.

C. *9α-chloro-16α-methyl-11β,17α,21-trihydroxy-1,5-pregnadiene-3,20-dione.*—The 21-acetate of the 9α-chloropregnadiene prepared in above Example 14B is converted to the corresponding 21-hydroxy with the aid of a culture of *Flavobacterium dehydrogenans* in the manner of Example 2 to yield 9α-chloro-16α-methyl-11β,17α,21-trihydroxy-1,5-pregnadiene-3,20-dione.

Alternatively, the compound of this example may be prepared from 6β-bromo-9α-chloro-16α-methyl-11β,17α,21-trihydroxy-1,4-pregnadiene-3,20-dione 21-acetate (prepared as in Example 14A) in the manner described in the alternative procedure of Example 13 whereby the 21-acetate of the 6β-bromo-1,4-pregnadiene is converted to the corresponding 21-hydroxy which, in turn, is reacted with zinc in ethanol-water to give 9α-chloro-16α-methyl-11β,17α,21-trihydroxy-1,5-pregnadiene-3,20-dione.

EXAMPLE 15

*9α-chloro-16β-methyl-11β,17α,21-trihydroxy-1,5-pregnadiene-3,20-dione*

A. *6β-bromo-9α-chloro-16β-methyl-11β,17α,21-trihydroxy-1,4-pregnadiene-3,20-dione 21-acetate.*—The requisite intermediate, 9α-chloro-16β-methyl-11β,17α,21-trihydroxy-1,4-pregnadiene-3,20-dione 21-acetate, is prepared according to the procedure described in co-pending application Serial No. 733,843 of Rausser et al., filed May 8, 1958.

The 9α-chloro-16β-methyl-11β,17α,21-trihydroxy-1,4-pregnadiene-3,20-dione 21-acetate is brominated and the resulting product isolated in the manner of Example 10A to give 6β-bromo-9α-chloro-16β-methyl-11β,17α,21-trihydroxy-1,4-pregnadiene-3,20-dione 21-acetate.

B. *9α-chloro-16β-methyl-11β,17α,21-trihydroxy-1,5-pregnadiene-3,20-dione 21-acetate.*—The 6β-bromo-9α-chloro-1,4-pregnadiene of above Example 15A is reacted with zinc powder in ethanol-water in the manner of Example 10B to give 9α-chloro-16β-methyl-11β,17α,21-trihydroxy-1,5-pregnadiene-3,20-dione 21-acetate.

C. *9α-chloro-16β-methyl-11β,17α,21-trihydroxy-1,5-pregnadiene-3,20-dione.*—The 21-acetate of the 9α-chloro-16β-methylpregnadiene, prepared in above Example 15B, is converted to the corresponding 21-hydroxy with the aid of a culture in *Flavobacterium dehydrogenans* in the manner of Example 2 to give 9α-chloro-16β-methyl-11β,17α,21-trihydroxy-1,5-pregnadiene-3,20-dione.

Alternatively, the 21-alcohol of this example may be prepared by the alternative procedure of Example 13 whereby the 6β-bromo-9α-chloro-16β-methyl-11β,17α,21-trihydroxy-1,5-pregnadiene-3,20-dione 21-acetate, prepared in Example 15B, is hydrolyzed to the corresponding 21-alcohol which, in turn, is reacted with zinc in ethanol-water to give 9α-chloro-16β-methyl-11β,17α,21-trihydroxy-1,5-pregnadiene-3,20-dione.

EXAMPLE 16

*9α-fluoro-16α-methyl-17α,21-dihydroxy-1,5-pregnadiene-3,11,20-trione*

A. *6β-bromo-9α-fluoro-16α-methyl-17α,21-dihydroxy-1,4-pregnadiene-3,11,20-trione 21-acetate.*—The requisite intermediate, 9α-fluoro-16α-methyl-17α,21-dihydroxy-1,4-pregnadiene-3,11,20-trione 21-acetate is prepared in the manner described in co-pending application Serial No. 733,843 of Rausser et al., filed May 8, 1958.

*9α-fluoro-16α-methyl-17α,21-dihydroxy-1,4-pregnadiene-3,11,20-trione* 21-acetate is brominated, and the resulting product isolated in the manner described in Example 10A to yield 6β-bromo-9α-fluoro-16α-methyl-17α,21-dihydroxy-1,4-pregnadiene-3,11,20-trione 21-acetate.

B. *9α-fluoro-16α-methyl-17α,21-dihydroxy-1,5-pregnadiene-3,11,20-trione 21-acetate.*—The 6β-bromo-1,4-pregnadiene of above Example 16A is reacted with zinc powder in aqueous ethanol in the manner of Example 10B and isolated, and purified in the described manner to give 9α-fluoro-16α-methyl-17α,21-dihydroxy-1,5-pregnadiene-3,11,20-trione 21-acetate.

C. *9α-fluoro-16α-methyl-17α,21-dihydroxy-1,5-pregnadiene-3,11,20-trione.*—The 9α-fluoro-1,5-pregnadiene 21-acetate of Example 16B is converted to the corresponding 21-hydroxy by the action of a culture of *Flavobacterium dehydrogenans* in the manner of Example 2 to yield 9α-fluoro-16α-methyl-17α,21-dihydroxy-1,5-pregnadiene-3,11,20-trione.

Alternatively, the compound of this example may be prepared in the manner described in the alternative procedure of Example 13, whereby 6β-bromo-9α-fluoro-16α-methyl-17α,21-dihydroxy-1,4-pregnadiene-3,11,20-trione 21-acetate (the compound of Example 16A) is first hydrolyzed to the corresponding 21-alcohol, then reacted with zinc to yield 9α-fluoro-16α-methyl-17α,21-dihydroxy-1,5-pregnadiene-3,11,20-trione.

EXAMPLE 17

*9α-fluoro-16β-methyl - 17α,21 - dihydroxy-1,5-pregnadiene-3,11,20-trione*

A. *6β-bromo-9α-fluoro - 16β - methyl - 17α,21 - dihydroxy-1,4-pregnadiene-3,11,20-trione 21-acetate.*—The requisite intermediate, 9α-fluoro-16β-methyl-17α,21-dihydroxy-1,4-pregnadiene-3,11,20-trione 21-acetate, is prepared by the process described in co-pending application Serial No. 733,843 of Rausser et al., filed May 8, 1958.

In the manner of Example 10A, 9α-fluoro-16β-methyl-17α,21-dihydroxy-1,4 - pregnadiene-3,11,20-trione 21-acetate is brominated and the resulting product isolated to give 6β-bromo-9α-fluoro-16β-methyl-17α,21 - dihydroxy-1,4-pregnadiene-3,11,20-trione 21-acetate.

B. *9α-fluoro-16β-methyl - 17α,21 - dihydroxy-1,5-pregnadiene-3,11,20-trione 21-acetate.*—In the manner of Example 10B, the 6β-bromo-1,4-pregnadiene of above Example 17A is reacted with zinc in aqueous ethanol to give 9α-fluoro-16β-methyl - 17α,21 - dihydroxy-1,5-pregnadiene-3,11,20-trione 21-acetate.

C. *9α-fluoro-16β-methyl - 17α,21 - dihydroxy-1,5-pregnadiene-3,11,20-trione.*—In the manner of Example 2, the 9α-fluoro-16β-methyl-1,5-pregnadiene 21-acetate of Example 17B, is converted to the corresponding 21-alcohol by the action of a culture of *Flavobacterium dehydrogenans* to give 9α-fluoro-16β-methyl-17α,21-dihydroxy-1,5-pregnadiene-3,11,20-trione.

Alternatively, the compound of this example may be prepared by the alternate procedure of Example 13 from 6β-bromo-9α-fluoro-16β-methyl - 17α,21 - dihydroxy-1,5-pregnadiene-3,11,20-trione 21-acetate (the compound of Example 17A) to give 9α-fluoro-16β-methyl-17α,21-dihydroxy-1,5-pregnadiene-3,11,20-trione.

EXAMPLE 18

*9α-bromo-16β-methyl - 11β,17α,21 - trihydroxy-1,5-pregnadiene-3,20-dione*

A. *6β,9α-dibromo - 16β - methyl - 11β,17α,21 - trihydroxy-1,4-pregnadiene - 3,20 - dione 21-acetate.*—The requisite intermediate, 9α-bromo-16β-methyl-11β,17α,21-trihydroxy-1,4-pregnadiene-3,20-dione 21-acetate, is prepared by the procedure described in co-pending application Serial No. 733,843 of Rausser et al., filed May 8, 1958.

In the manner described in Example 10A, the 9α-bromo-1,4-pregnadiene intermediate of this example is brominated, and the resulting product isolated to give 6β,9α-dibromo-16β-methyl - 11β,17α,21 - trihydroxy-1,4-pregnadiene-3,20-dione 21-acetate.

B. *9α-bromo-16β-methyl - 11β,17α,21 - trihydroxy-1,5-pregnadiene-3,20-dione 21-acetate.*—In the manner of Example 10B, the 6β,9α-dibromo-1,4-pregnadiene of Example 18A, is reacted with zinc in aqueous ethanol and the resulting product isolated and purified in the described manner to give 9α-bromo-16β-methyl-11β,17α,21-trihydroxy-1,5-pregnadiene-3,20-dione 21-acetate.

C. *9α - bromo - 16β - methyl - 11β,17α,21 - trihydroxy - 1,5 - pregnadiene - 3,20 - dione.*—The 21-acetate of Example 18B is converted to the corresponding 21-alcohol with the aid of a culture of *Flavobacterium dehydrogenans* in the manner of Example 2 to give 9α-bromo - 16β - methyl - 11β,17α,21 - trihydroxy - 1,5-pregnadiene - 3,20 - dione.

Alternatively, the compound of this example may be prepared by the alternative procedure of Example 13 from 6β,9α - dibromo - 16β - methyl - 11β,17α,21 - trihydroxy - 1,4 - pregnadiene - 3,20 - dione 21 - acetate to give 9α - bromo - 16β - methyl - 11β,17α,21 - trihydroxy-1,5 - pregnadiene - 3,20 - dione.

EXAMPLE 19

*9α - bromo - 16α - methyl - 11β,17α,21 - trihydroxy-1,5 - pregnadiene - 3,20 - dione*

A. *6β,9α - dibromo - 16α - methyl - 11β,17α,21 - trihydroxy - 1,5 - pregnadiene - 3,20 - dione 21 - acetate.*—The requisite intermediate, 9α - bromo - 16α - methyl-11β,17α,21 - trihydroxy - 1,4 - pregnadiene - 3,20 - dione 21 - acetate is prepared by the process of copending application Serial No. 733,843 of Rausser et al., filed May 8, 1958.

The above bromo intermediate is brominated, and the resulting product isolated in the manner of Example 10A to yield 6β,9α - dibromo - 16α - methyl - 11β,17α,-21 - trihydroxy - 1,4 - pregnadiene - 3,20 - dione 21-acetate.

B. *9α-bromo-16α-methyl - 11β,17α,21 - trihydroxy - 1,5-pregnadiene - 3,20 - dione 21 - acetate.*—In the manner of Example 10B, the 6β,9α - dibromo - 1,4 - pregnadiene of Example 19A is reacted with zinc in aqueous ethanol to give 9α - bromo 16α - methyl - 11β,17α,21 - trihydroxy - 1,5 - pregnadiene - 3,20 - dione 21 - acetate.

C. *9α - bromo - 16α - methyl - 11β,17α,21 - trihydroxy - 1,5 - pregnadiene - 3,20 - dione.*—The 21-acetate pregnadiene of Example 19B is hydrolyzed to the corresponding 21-alcohol with the aid of a culture of *Flavobacterium dehydrogenans* in the manner of Example 2 to give 9α - bromo - 16α - methyl - 11β,17α,21 -trihydroxy - 1,5 - pregnadiene - 3,20 - dione.

The compound of this example may also be prepared from 6β,9α - dibromo - 16α - methyl - 11β,17α,21 - trihydroxy - 1,4 - pregnadiene - 3,20 - dione 21 - acetate (the compound of Example 19A) by the alternate process of Example 13 yielding 9α - bromo - 16α - methyl-11β,17α,21 - trihydroxy - 1,5 - pregnadiene - 3,20 - dione.

EXAMPLE 20

*9α - bromo - 16α - methyl - 17α,21 - dihydroxy - 1,5-pregnadiene - 3,11,20 - trione*

A. *6β,9α - dibromo - 16α - methyl - 17α,21 - dihydroxy - 1,4 - pregnadiene - 3,11,20 - trione 21 - acetate.*—The requisite intermediate, 9α - bromo - 16α-methyl - 17α,21 - dihydroxy - 1,4 - pregnadiene - 3,11,-20 - trione 21 - acetate, is prepared according to the procedure in co-pending application Serial No. 733,843 of Rausser et al., filed May 8, 1958.

This intermediate is brominated in the manner of Example 10A and the resulting product isolated in the described manner to give 6β,9α - dibromo - 16α - methyl-17α,21 - dihydroxy - 1,4 - pregnadiene - 3,11,20 - trione 21-acetate.

B. *9α - bromo - 16α - methyl - 17α,21 - dihydroxy-1,5 - pregnadiene - 3,11,20 - trione 21 - acetate.*—The dibromide of Example 20A is reacted with zinc in aqueous ethanol in the manner of Example 10B, and the resulting product isolated and purified in the described manner to give 9α - bromo - 16α - methyl - 17α,21 - dihydroxy - 1,5 - pregnadiene - 3,11,20 - trione 21 - acetate.

C. *9α - bromo - 16α - methyl - 17α,21 - dihydroxy-1,5 - pregnadiene - 3,11,20 - trione.*—In the manner described in Example 2, the 21-acetate of above Example 20B is hydrolyzed to the corresponding 21-alcohol with the aid of a culture of *Flavobacterium dehydrogenans* to give 9α - bromo - 16α - methyl - 17α,21 - dihydroxy-1,5 - pregnadiene - 3,11,20 - trione.

Alternatively, the compound of this example may be prepared by the alternative process of Example 13 from 6β,9α - dibromo - 16α - methyl - 17α,21 - dihydroxy-1,4 - pregnadiene - 3,11,20 - trione 21 - acetate.

EXAMPLE 21

*9α - bromo - 16β - methyl - 17α,21 - dihydroxy - 1,5-pregnadiene - 3,11,20 - trione*

A. *6β,9α - dibromo - 16β - methyl - 17α,21 - dihydroxy - 1,4 - pregnadiene - 3,11,20 - trione 21 - ace-*

*tate.*—The requisite intermediate, 9α - bromo - 16β-methyl - 17α,21 - dihydroxy - 1,4 - pregnadiene - 3,11,-20 - trione 21 - acetate is prepared by the process of co-pending application Serial No. 733,843 of Rausser et al., filed May 8, 1958.

The 9α - bromopregnadiene intermediate is brominated and isolated in the manner of Example 10A to give 6β,-9α - dibromo - 16β - methyl - 17α,21 - dihydroxy - 1,4-pregnadiene - 3,11,20 - trione 21 - acetate.

B. *9α - bromo - 16β - methyl - 17α,21 - dihydroxy-1,5 - pregnadiene - 3,11,20 - trione 21 - acetate.*—The dibromide of Example 21A is reacted with zinc powder in aqueous ethanol in the manner of Example 10B, and the resulting product isolated and purified in the described manner to give 9α - bromo - 16β - methyl - 17α,21 - dihydroxy - 1,5 - pregnadiene - 3,11,20 - trione 21 - acetate.

C. *9α - bromo - 16β - methyl - 17α,21 - dihydroxy-1,5 - pregnadiene - 3,11,20 - trione.*—The 21 - acetate of Example 21B is hydrolyzed to the corresponding alcohol with the aid of a culture of *Flavobacterium dehydrogenans* to yield 9α - bromo - 16β - methyl - 17α,21 - dihydroxy - 1,5 - pregnadiene - 3,11,20 - trione.

EXAMPLE 22

*16α - methyl - 11β,17α,21 - trihydroxy - 1,5 - pregnadiene - 3,20 - dione*

A. *6β - bromo - 16α - methyl - 11β,17α,21 - trihydroxy - 1,4 - pregnadiene - 3,20 - dione 21 - acetate.*—The requisite intermediate, 16α - methyl - 11β,17α,21-trihydroxy - 1,4 - pregnadiene - 3,20 - dione 21-acetate, is prepared by the process of co-pending application Serial No. 733,843 of Rausser et al., filed May 8, 1958.

The 16α - methyl - 1,4 - pregnadiene intermediate is brominated and the resulting product isolated in the manner of Example 10A to give 6β - bromo - 16α-methyl - 11β,17α,21 - trihydroxy - 1,4 - pregnadiene-3,20 - dione 21 - acetate.

B. *16α - methyl - 11β,17α,21 - trihydroxy - 1,5 - pregnadiene - 3,20 - dione 21 - acetate.*—The 6β - bromo-1,4 - pregnadiene of Example 22A (500 mg.) is dissolved in 150 ml. of absolute ethanol, then 25 ml. of water and 5 g. of zinc powder are added. The suspension is stirred at room temperature for 8 hours, after which time the zinc is filtered. The filtrate is concentrated in vacuo to a residue which is crystallized from acetone to give 16α - methyl - 11β,17α,21 - trihydroxy-1,5 - pregnadiene - 3,20 - dione 21 - acetate.

Alternatively, the compound of this example is prepared from the 6β - bromo - 1,4 - pregnadiene of Example 22A with zinc in ethanol by the procedure of Example 10B.

C. *16α - methyl - 11β,17α,21 - trihydroxy - 1,5 - pregnadiene - 3,20 - dione.*—The 21-acetate of above Example 22B is hydrolyzed to the corresponding 21-alcohol with the aid of a culture of *Flavobacterium dehydrogenans* in the manner of Example 2 to give 16α - methyl-11β,17α,21 - trihydroxy - 1,5 - pregnadiene - 3,20 - dione.

Alternatively, the product of this example may be prepared from 6β - bromo - 16α - methyl - 11β,17α,21-trihydroxy - 1,4 - pregnadiene - 3,20 - dione 21 - acetate by the alternative process of Example 13.

EXAMPLE 23

*16β - methyl - 11β,17α,21 - trihydroxy - 1,5 - pregnadiene - 3,20 - dione*

A. *6β - bromo - 16β - methyl - 11β,17α,21 - trihydroxy - 1,4 - pregnadiene - 3,20 - dione 21 - acetate.*—The requisite intermediate, 16β - methyl - 11β,17α,21-trihydroxy - 1,4 - pregnadiene - 3,20 - dione 21 - acetate, is prepared according to the process of co-pending application Serial No. 733,843 of Rausser et al., filed May 8, 1958.

This 16β-methyl-1,4-pregnadiene intermediate is brominated, and the resulting product isolated and purified in the manner of Example 10A to give 6β-bromo-16β-methyl - 11β,17α,21 - trihydroxy - 1,4 - pregnadiene - 3, 20-dione 21-acetate.

B. *16β - methyl - 11β,17α,21 - trihydroxy - 1,5 - pregnadiene-3,20-dione 21-acetate.*—The 6β-bromo-1,4-pregnadiene of Example 23A is reacted with zinc powder in aqueous ethanol in the manner of Example 22B, and the resulting product isolated and purified in the described manner to give 16β-methyl-11β,17α,21-trihydroxy-1,5-pregnadiene-3,20-dione 21-acetate.

C. *16β - methyl - 11β,17α,21 - trihydroxy - 1,5-pregnadiene-3,20-dione.*—The 21-acetate of Example 23B is hydrolyzed to the corresponding 21-alcohol with the aid of a culture of *Flavobacterium dehydrogenans* in the manner described in Example 2 to give 16β-methyl-11β,17α, 21-trihydroxy-1,5-pregnadiene-3,20-dione.

Alternatively, the compound of this example may be prepared from 6β-bromo-16β-methyl-11β,17α,21-trihydroxy-1,4-pregnadiene-3,20-dione 21-acetate (the compound of Example 23A) by the alternative process of Example 13.

EXAMPLE 24

*16α-methyl-17α,21-dihydroxy-1,5-pregnadiene-3,11,20-trione*

A. *6β - bromo - 16α - methyl - 17α,21 - dihydroxy - 1, 4-pregnadiene-3,11,20-trione 21-acetate.*—The requisite intermediate, 16α - methyl - 17α,21 - dihydroxy - 1,4 - pregnadiene-3,11,20-trione 21-acetate, is prepared according to the process of co-pending application Serial No. 733,843 of Rausser et al., filed May 8, 1958.

This 16α-methyl-1,4-pregnadiene intermediate is brominated and the resulting product isolated in the manner of Example 10A to give 6β-bromo-16α-methyl-17α,21-dihydroxy-1,4-pregnadiene-3,11,20-trione 21-acetate.

B. *16α - methyl - 17α,21 - dihydroxy - 1,5 - pregnadiene-3,11,20-trione 21-acetate.*—The 6β-bromo-1,4-pregnadiene of Example 24A is reacted with zinc powder in aqueous ethanol in the manner of Example 22B, and the resulting product isolated and purified in the described manner to give 16α-methyl-17α,21-dihydroxy-1,5-pregnadiene-3,11,20-trione 21-acetate.

C. *16α - methyl - 17α,21 - dihydroxy - 1,5 - pregnadiene-3,11,20-trione.*—The 21-acetate of Example 24B is hydrolyzed to the corresponding 21-alcohol with the aid of a culture of *Flavobacterium dehydrogenans* in the manner described in Example 2 to give 16α-methyl-17α, 21-dihydroxy-1,5-pregnadiene-3,11,20-trione.

Alternatively, the compound of this example may be prepared from 6β-bromo-16α-methyl-17α,21-dihydroxy-1, 4-pregnadiene-3,11,20-trione 21-acetate (the compound of Example 24A) by the alternative process of Example 13.

EXAMPLE 25

*16β-methyl-17α,21-dihydroxy-1,5-pregnadiene-3,11,20-trione*

A. *6β - bromo - 16β - methyl - 17α,21 - dihydroxy - 1, 4-pregnadiene-3,11,20-trione 21-acetate.*—The requisite intermediate, 16β-methyl-17α,21-dihydroxy-1,4-pregnadiene-3,11,20-trione 21-acetate is prepared according to the process of co-pending application Serial No. 733,843 of Rausser et al., filed May 8, 1958.

This 16β-methyl-1,4-pregnadiene intermediate is brominated and the resulting product isolated in the manner of Example 10A to give 6β-bromo-16β-methyl-17α,21-dihydroxy-1,4-pregnadiene-3,11,20-trione 21-acetate.

B. *16β - methyl - 17α,21 - dihydroxy - 1,5 - pregnadiene-3,11,20-trione 21-acetate.*—The 6β-bromo-1,4-pregnadiene of Example 25A is reacted with zinc powder in aqueous ethanol in the manner of Example 22B, and the resulting product isolated and purified in the described manner to give 16β-methyl-17α,21-dihydroxy-1,5-pregnadiene-3,11,20 trione 21-acetate.

C. *16β - methyl - 17α,21 - dihydroxy - 1,5 - pregna-* diene-3,11,20-trione.—The 21-acetate of Example 25B is hydrolyzed to the corresponding 21-alcohol with the aid of a culture of *Flavobacterium dehydrogenans* in the manner described in Example 2 to give 16β-methyl-17α,21-dihydroxy-1,5-pregnadiene-3,11,20-trione.

Alternatively, the compound of this example may be prepared from 6β-bromo-16β-methyl-17α,21-dihydroxy-1,4-pregnadiene-3,11,20-trione 21-acetate (the compound of Example 25A) by the alternative process of Example 13.

EXAMPLE 26

*16α-ethyl-17α,21-dihydroxy-1,5-pregnadiene-3,11,20-trione*

A. *6β - bromo - 16α - ethyl - 17α,21 - dihydroxy - 1,4 - pregnadiene-3,11,20-trione 21-acetate.*—The requisite intermediate, 16α-ethyl-17α,21-dihydroxy-1,4-pregnadiene-3,11,20-trione 21-acetate is prepared according to the process of co-pending application Serial No. 733,843 of Rausser et al., filed May 8, 1958.

This 16α-ethyl-1,4-pregnadiene intermediate is brominated and the resulting product isolated in the manner of Example 10A to give 6β-bromo-16α-ethyl-17α,21-dihydroxy-1,4-pregnadiene-3,11,20-trione 21-acetate.

B. *16α - ethyl - 17α,21 - dihydroxy - 1,5 - pregnadiene - 3,11,20-trione 21-acetate.*—The 6β-bromo-1,4-pregnadiene of Example 26A is reacted with zinc powder in aqueous ethanol in the manner of Example 10B, and the resulting product isolated and purified in the described manner to give 16α-ethyl-17α,21-dihydroxy-1,5-pregnadiene-3,11,20-trione 21-acetate.

C. *16α - ethyl - 17α,21 - dihydroxy - 1,5 - pregnadiene - 3,11,20-trione.*—The 21-acetate of Example 26B is hydrolyzed to the corresponding 21-alcohol with the aid of a culture of *Flavobacterium dehydrogenans* in the manner described in Example 2 to give 16α-ethyl-17α,21-dihydroxy-1,5-pregnadiene-3,11,20-trione.

Alternatively, the compound of this example may be prepared from 6β-bromo-16α-ethyl-17α,21-dihydroxy-1,4-pregnadiene-3,11,20-trione 21-acetate (the compound of Example 26A) by the alternative process of Example 13.

EXAMPLE 27

*16α-ethyl-11β,17α,21-trihydroxy-1,5-pregnadiene-3,20-dione*

A. *6β - bromo - 16α - ethyl - 11β,17α,21 - trihydroxy - 1,4-pregnadiene-3,20-dione 21-acetate.*—The requisite intermediate, 16α-ethyl-11β,17α,21-trihydroxy-1,4-pregnadiene-3,20-dione 21-acetate, is prepared according to the process of co-pending application Serial No. 733,843 of Rausser et al., filed May 8, 1958.

This 16α-ethyl-1,4-pregnadiene intermediate is brominated and the resulting product isolated in the manner of Example 10A to give 6β-bromo-16α-ethyl-11β,17α,21-trihydroxy-1,4-pregnadiene-3,20-dione 21-acetate.

B. *16α - ethyl - 11β,17α,21 - trihydroxy - 1,5 - pregnadiene-3,20-dione 21-acetate.*—The 6β-bromo-1,4-pregnadiene of Example 27A is reacted with zinc powder in aqueous ethanol in the manner of Example 10B, and the resulting product isolated and purified in the described manner to give 16α-ethyl-11β,17α,21-trihydroxy-1,5-pregnadiene-3,20-dione 21-acetate.

C. *16α - ethyl - 11β,17α,21 - trihydroxy - 1,5 - pregnadiene-3,20-dione.*—The 21-acetate of Example 27B is hydrolyzed to the corresponding 21-alcohol with the aid of a culture of *Flavobacterium dehydrogenans* in the manner described in Example 2 to give 16α-ethyl-11β,17α,21-trihydroxy-1,5-pregnadiene-3,20-dione.

Alternatively, the compound of this example may be prepared from 6β - bromo-16α-ethyl-11β,17α,21 - trihydroxy-1,4-pregnadine-3,20-dione 21-acetate (the compound of Example 27A) by the alternative process of Example 13.

EXAMPLE 28

*9α-bromo-16α-ethyl-11β,17α,21-trihydroxy-1,5-pregnadiene-3,20-dione*

A. *6β,9α - dibromo - 16α - ethyl-11β,17α,21-trihydroxy-1,4-pregnadiene-3,20-dione 21-acetate.*—The requisite intermediate, 9α-bromo-16α-ethyl - 11β,17α,21 - trihydroxy-1,4-pregnadiene-3,20-dione 21-acetate, is prepared according to the process of copending application Serial No. 733,843 of Rausser et al., filed May 8, 1958.

This 9α-bromo-16α-ethyl-1,4-pregnadiene intermediate is brominated and the resulting product isolated in the manner of Example 10A to give 6β,9α-dibromo-16α-ethyl-11β,17α,21-trihydroxy-1,4-pregnadiene-3,20 - dione 21-acetate.

B. *9α-bromo - 16α - ethyl - 11β,17α,21-trihydroxy-1,5-pregnadiene-3,20-dione 21-acetate.*—The 6β-bromo-1,4-pregnadiene of Example 28A is reacted with zinc powder in aqueous ethanol in the manner of Example 10B, and the resulting product isolated and purified in the described manner to give 9α-bromo-16α-ethyl-11β,17α,21-trihydroxy-1,5-pregnadiene-3,20-dione 21-acetate.

C. *9α - bromo - 16α - ethyl - 11β,17α,21-trihydroxy-1,5-pregnadiene-3,20-dione.*—The 21-acetate of Example 28B is hydrolyzed to the corresponding 21-alcohol with the aid of a culture of *Flavobacterium dehydrogenans* in the manner described in Example 2 to give 9α-bromo-16α-ethyl-11β,17α,21-trihydroxy-1,5-pregnadiene-3,20-dione.

Alternatively, the compound of this example may be prepared from 6β,9α-dibromo-16α-ethyl-11β,17α,21 - trihydroxy - 1,4 - pregnadiene - 3,20 - dione 21-acetate (the compound of Example 28A) by the alternative process of Example 13.

EXAMPLE 29

*9α-fluoro-16α-ethyl-11β,17α,21-trihydroxy-1,5-pregnadiene-3,20-dione*

A. *6β-bromo-9α - fluoro-16α-ethyl - 11β,17α,21 - trihydroxy-1,4-pregnadiene-3,20-dione 21-acetate.*—The requisite intermediate, 9α-fluoro-16α-ethyl-11β,17α,21-trihydroxy-1,4-pregnadiene-3,20-dione 21-acetate, is prepared according to the process of co-pending application Serial No. 733,843 of Rausser et al., filed May 8, 1958.

This 9α-fluoro-16α-ethyl-1,4-pregnadiene intermediate is brominated and the resulting product isolated in the manner of Example 10A to give 6β-bromo-9α-fluoro-16α-ethyl-11β,17α,21 - trihydroxy - 1,4 - pregnadiene - 3,20-dione 21-acetate.

B. *9α - fluoro - 16α - ethyl - 11β,17α,21 - trihydroxy-1,5 -pregnadiene - 3,20 - dione 21-acetate.*—The 6β-bromo-9α-fluoro-1,4-pregnadiene of Example 29A is reacted with zinc powder in aqueous ethanol in the manner of Example 10B, and the resulting product isolated and purified in the described manner to give 9α-fluoro-16α-ethyl-11β,17α,21-trihydroxy-1,5-pregnadiene - 3,20 - dione 21-acetate.

C. *9α - fluoro - 16α - ethyl - 11β,17α,21 - trihydroxy-1,5 - pregnadiene - 3,20 - dione.*—The 21-acetate of Example 29B is hydrolyzed to the corresponding 21-alcohol with the aid of a culture of *Flavobacterium dehydrogenans* in the manner described in Example 2 to give 9α-fluoro-16α-ethyl-11β,17α,21-trihydroxy-1,5 - pregnadiene-3,20-dione.

Alternatively, the compound of this example may be prepared from 6β - bromo - 9α - fluoro - 16α - ethyl - 11β,17α,21 - trihydroxy - 1,4 - pregnadiene - 3,20 - dione 21-acetate (the compound of Example 29A) by the alternative process of Example 13.

EXAMPLE 30

*9α-fluoro-16α-ethyl-17α,21-dihydroxy-1,5-pregnadiene-3,11,20-trione*

A. *6β - bromo-9α-fluoro - 16α - ethyl-17α,21-dihydroxy-1,4-pregnadiene-3,11,20-trione 21-acetate.*—The requisite intermediate, 9α-fluoro-16α-ethyl - 17α,21 - dihydroxy-1,4- pregnadiene-3,11,20-trione 21-acetate, is prepared according to the process of co-pending application Serial No. 733,843 of Rausser et al., filed May 8, 1958.

This 9α-fluoro-16α-ethyl-1,4-pregnadiene intermediate is brominated and the resulting product isolated in the manner of Example 10A to give 6β-bromo-9α-fluoro-16α-ethyl-17α,21-dihydroxy - 1,4 - pregnadiene - 3,11,20 -trione 21-acetate.

B. *9α - fluoro - 16α - ethyl - 17α,21 - dihydroxy - 1,5-pregnadiene - 3,11,20 - trione 21-acetate.*—The 6β-bromo-9α-fluoro-1,4-pregnadiene of Example 30A is reacted with zinc powder in aqueous ethanol in the manner of Example 10B, and the resulting product isolated and purified in the described manner to give 9α-fluoro-16α-ethyl-17α,21-dihydroxy-1,5-pregnadiene-3,11,20-trione 21-acetate.

C. *9α - fluoro - 16α - ethyl - 17α,21 - dihydroxy - 1,5-pregnadiene-3,11,20-trione.*—The 21-acetate of Example 30B is hydrolyzed to the corresponding 21-alcohol with the aid of a culture of *Flavobacterium dehydrogenans* in the manner described in Example 2 to give 9α-fluoro-16α-ethyl-17α,21-dihydroxy-1,5-pregnadiene-3,11,20-trione.

Alternatively, the compound of this example may be prepared from 6β-bromo-9α-fluoro-16α-ethyl-17α,21 - dihydroxy - 1,4 - pregnadiene - 3,11,20 - trione 21-acetate (the compound of Example 30A) by the alternative process of Example 3.

EXAMPLE 31

*16α-n-butyl-17α,21-dihydroxy-1,5-pregnadiene-3,11,20-trione*

A. *6β - bromo - 16α - n - butyl - 17α,21-dihydroxy-1,4-pregnadiene-3,11,20-trione 21-acetate.*—The requisite intermediate, 16α-n-butyl-17α,21 - dihydroxy - 1,4 - pregnadiene-3,11,20-trione 21-acetate, is derived from 16α-n-butylcortisone 21-acetate, which, in turn, is prepared according to the process of copending application Serial No. 733,843 of Rausser et al., filed May 8, 1958. 16α - n - butylcortisone 21-acetate is subjected to the action of a culture of *Corynebacterium simplex* (A.T.C.C. 6946) in the manner disclosed in U.S. Patent No. 2,837,464, and the resulting reaction mixture extracted with chloroform in the described manner. The chloroform extracts are combined and concentrated to a residue which, after crystallization from acetone, gives 16α-n-butyl-17α,21-dihydroxy-1,4 - pregnadiene - 3,11,20 - trione 21-acetate.

16α - n - butyl - 17α,21 - dihydroxy - 1,4-pregnadiene-3,11,20-trione 21-acetate is brominated and the resulting product isolated in the manner of Example 10A to give 6β-bromo-16α-n-butyl - 17α,21 - dihydroxy - 1,4-pregnadiene-3,11,20-trione 21-acetate.

B. *16α - n - butyl - 17α,21 - dihydroxy-1,5-pregnadiene-3,11,20-trione 21 - acetate.*—The 6β-bromo-16α-n-butyl-1,4-pregnadiene of above Example 31A is reacted with zinc in aqueous ethanol in the manner of Example 10B and the resulting product isolated and purified in the described manner to give 16α-n-butyl-17α,21-dihydroxy-1,5 pregnadiene-3,11,20-trione 21-acetate.

C. *16α - n- butyl - 17α,21 - dihydroxy-1,5-pregnadiene-3,11,20-trione.*—The 21-acetate of above Example 31B is hydrolyzed to the corresponding 21-alcohol with the aid of a culture of *Flavobacterium dehydrogenans* by the procedure described in Example 2.

Alternatively, the compound of this example may be prepared from 6β-bromo-16α-n-butyl-17α,21-dihydroxy-1,4-pregnadiene-3,11,20-trione 21-acetate (the compound of Example 31B) by the alternative process of Example 13.

EXAMPLE 32

*16β-n-butyl-17α,21-dihydroxy-1,5-pregnadiene-3,11,20-trione*

The requisite intermediate, 16β-n-butyl-17α,21-dihydroxy-1,4-pregnadiene-3,11,20-trione 21-acetate, is derived from 16β-n-butylcortisone 21-acetate which is prepared by the process of co-pending application Serial No. 733,843 of Rausser et al, filed May 8, 1958. When subjected to the action of a culture of *Corynebacterium simplex* in the manner disclosed in U.S. Patent No. 2,837,464, and the resulting product isolated and purified as described in Example 31A, 16β-n-butylcortisone 21-acetate is converted to 16β-n-butyl-17α,21-dihydroxy-1,4-pregnadiene-3,11,20-trione 21-acetate.

In the manner of Example 31, 16β-n-butyl-17α,21-dihydroxy-1,4-pregnadiene-3,11,20 - trione 21 - acetate is brominated to the corresponding 6β-bromo-derivative which, in turn, is reacted with zinc in aqueous ethanol to give 16β-n-butyl-17α,21-hydroxy-1,5-pregnadiene-3,11,20-trione 21-acetate.

The 21-acetate is then hydrolyzed to the 21-alcohol in the described manner to give 16β-n-butyl-17α,21-dihydroxy-1,5-pregnadiene-3,11,20-trione.

EXAMPLE 33

*16α-methyl-17α,21-dihydroxy-1,5-pregnadiene-3,11,20-trione 21-n-propionate*

To one gram of 16α-methyl-17α,21-dihydroxy-1,5-pregnadiene-3,11,20-trione, the compound of Example 24, there is added 0.5 ml. of n-propionic anhydride in 2.3 ml. of pyridine. After standing for one hour at room temperature, the mixture is poured into ice and hydrochloric acid. The resulting precipitate is filtered and recrystallized from aqueous methanol to yield 16α-methyl-17α,21-dihydroxy-1,5-pregnadiene - 3,11,20 - trione 21-n-propionate.

Similarly, any one of the 21-hydroxy-1,5-pregnadiene compounds of our invention may be treated with propionic anhydride in the above described manner to yield the corresponding 21-n-propionate ester.

By substituting anhydrides of other lower alkanoic acids, such as acetic, butyric, valeric and the like, for propionic anhydride in the procedure of Example 33, there may be obtained the corresponding 21-lower alkanoate of any 16-alkyl-1,5-pregnadiene-21-hydroxy starting compound.

EXAMPLE 34

*16α-methyl-17α,21-dihydroxy,1,5-pregnadiene-3,11,20-trione*

A. *16α - methyl-6β,17α,21-trihydroxy-1,4-pregnadiene-3,11,20-trione.*—The requisite intermediate, 16α-methyl-17α,21-dihydroxy-1,4-pregnadiene-3,11,20-trione, is prepared as described in co-pending application Serial No. 733,843 of Rausser et al., filed May 8, 1958.

Into each of ten 300 ml. Erlenmeyer flasks is placed 100 ml. of a growth medium having the following composition:

| | G. |
|---|---|
| Difco yeast extract | 3–10 |
| Corn steep liquor | 1 |
| Dextrose | 10 |
| Distilled or tap water, q.s. to one liter. | |

Each flask is inoculated with spores from an agar medium culture of *Chaetomium funicolum* (QM No. 33C) or with a 1–10% submerged inoculum which has been grown for 24–48 hours. The mixture is incubated by shaking the flasks on a rotary shaker for 24–48 hours at 28° C. at approximately 250 r.p.m. To each of the flasks (now showing prolific growth) is added, aseptically, 50 mg. of 16α-methyl-17α,21-dihydroxy-1,4-pregnadiene-3,11,20-trione in 2 ml. of ethanol. The fermentation mixture is then incubated and shaken for 24–72 hours at 28° C. after which time complete conversion occurs. The mixture is extracted thoroughly with chloroform and the small fraction of the product which is retained within the mycelium is extracted by boiling the mycelium in chloroform for a few minutes. The chloroform extracts are combined and evaporated to a residue yielding approximately 5 mg. of crude material. The residue is triturated with methanol affording a crystalline solid which is purified by crystallization from acetone yielding 16α-methyl-6β,17α,21-trihydroxy-1,4-pregnadiene-3,11,20-trione.

B. *16α-methyl-6β,17α,21 - trihydroxy-1,4-pregnadiene-3,11,20-trione 21-acetate.*—A solution of 25 mg. of the compound of Example 34A in 2 ml. of anhydrous pyridine is poured into 6 ml. of acetic anhydride in a nitrogen atmosphere. The mixture is stirred for 30 minutes and then poured into dilute sulfuric acid and ice. The resultant precipitate is removed by filtration, dried and crystallized from methanol, yielding 16α-methyl-6β,17α,21-trihydroxy-1,4-pregnadiene-3,11,20-trione 21-acetate.

C. *16α-methyl-6β,17α,21 - trihydroxy-1,4-pregnadiene-3,11,20-trione 6-methanesulfonate 21-acetate.*—100 mg. of 16α-methyl-6β,17α,21-trihydroxy-1,4-pregnadiene-3,11,20-trione 21-acetate, prepared as in Example 34B, is dissolved in 0.4 ml. of methylene chloride and 0.4 ml. of pyridine. The solution is cooled to 0° C., 1.6 ml. of methanesulfonyl chloride added, and the mixture stirred for 2 hours at 0° C., then left overnight at room temperature. The reaction mixture is then poured into water, the resulting precipitate which is filtered and air dried is 16α-methyl-6β,17α,21 - trihydroxy-1,4-pregnadiene - 3,11,20-trione 6-methanesulfonate 21-acetate.

D. *16α-methyl - 17α,21 - dihydroxy - 1,5-pregnadiene-3,11,20-trione 21-acetate.*—The 6-methanesulfonate-16α-methyl-1,4-pregnadiene (55 mg.) of above Example 34C is dissolved in 20 ml. of ethanol and 1 ml. of water. Zinc filings (100 mg.) are added, and the suspension stirred for 1 hour at 90° C. The solution is cooled, the zinc filtered, and the resulting filtrate concentrated to a residue of substantially 16α-methyl-17α,21-dihydroxy-1,5-pregnadiene-3,11,20-trione 21-acetate.

E. *16α-methyl - 17α,21 - dihydroxy-1,5-pregnadiene-3,11,20-trione.*—The 21-acetate of Example 34D is hydrolyzed to the corresponding 21-alcohol in the manner described in Example 2 to give 16α-methyl-17α,21-dihydroxy-1,5-pregnadiene-3,11,20-trione.

Alternatively, the compound of this example may be prepared as described in following procedures F and G.

F. *16α-methyl-6β,17α,21 - trihydroxy-1,4-pregnadiene-3,11,20-trione 6β,21-diacetate.*—A solution of 25 mg. of the compound of Example 34A in 2 ml. of anhydrous pyridine is poured onto 100 mg. of acetic anhydride in an anhydrous atmosphere. The mixture is stirred for 30 minutes and then poured into dilute sulfuric acid and ice. The resultant precipitate is removed by filtration, dried and crystallized from methanol, yielding 16α-methyl-6β,17α,21-trihydroxy-1,4-pregnadiene - 3,11,20 - trione 6β,21-diacetate.

G. *16α-methyl-17α,21 - dihydroxy - 1,5-pregnadiene-3,11,20-trione 21-acetate.*—The 6β,21-diacetate of Example 34F is reacted with zinc and alcohol in the manner described in Example 34D to give 16α-methyl-17α,21-dihydroxy-1,5-pregnadiene-3,11,20-trione 21-acetate.

The 21-acetate of this example is converted to the corresponding 21-hydroxy-1,5-pregnadiene in the manner of Example 2.

A third alternative process is described in following procedures H and I.

H. *16α - methyl - 6β,17α,21 - trihydroxy - 1,4 - pregnadiene - 3,11,20 - trione 6β - p - toluenesulfonate 21 - acetate.*—A solution of 100 mg. of the product of Example 34A in 2 ml. of anhydrous pyridine is treated with 100 mg. of p-toluenesulfonyl chloride and the mixture is stirred for 1 hour. The solution is poured into aqueous sulfuric acid and ice, and the resulting precipitate is removed by filtration, washed with water, dried, and crystallized from acetone-hexane to give 16α-methyl-6β,17α,21-trihydroxy-1,4-pregnadiene-3,11,20-trione 6β-p-toluenesulfonate 21-acetate.

I. *16α - methyl - 17α,21 - dihydroxy - 1,5 - pregnadiene - 3,11,20 - trione 21 - acetate.*—The 6-p-toluenesulfonate 21-acetate 1,4-pregnadiene of above Example 34H is reacted with zinc powder in the manner described in Example 22B to give 16α-methyl-17α,21-dihydroxy-1,5-pregnadiene-3,11,20-trione 21-acetate.

The 21-acetate of the 16α-methyl-1,5-pregnadiene prepared above is hydrolyzed to the corresponding 21-hydroxy compound in the manner described in Example 2.

EXAMPLE 35

*9α-bromo-16α-ethyl-17α,21-dihydroxy-1,5-pregnadiene-3,11,20-trione*

A. *9α - bromo - 16α - ethyl - 17α,21 - dihydroxy - 1,4-pregnadiene - 3,11,20 - trione 21 - acetate.*—The requisite intermediate, 9α-bromo-16α-ethyl-11β,17α,21-trihydroxy-1,4-pregnadiene-3,20-dione 21-acetate, is prepared as described in co-pending application Serial No. 733,843 of Rausser et al., filed May 8, 1958.

To a solution of 0.3 g. of 9α-bromo-16α-ethyl-17α,21-dihydroxy-1,5-pregnadiene-3,20-dione 21-acetate in 15 ml. of acetic acid, there is added dropwise a solution of 60 mg. of chromium trioxide in 1 ml. of water and 3 ml. of acetic acid. The resultant mixture is allowed to stand for 5 hours, then is diluted with water, and extracted with methylene chloride. The organic extracts are washed with water, dried over magnesium sulfate, filtered and evaporated to a residue which is crystallized from methanol to give 9α-bromo-16α-ethyl-17α,21-dihydroxy-1,4-pregnadiene-3,11,20-trione 21-acetate.

B. *6β,9α - dibromo - 16α - ethyl - 17α,21 - dihydroxy-1,4 - pregnadiene - 3,11,20 - trione 21 - acetate.*—The 9α-bromo-16α-ethyl-1,4-pregnadiene of Example 35A is brominated and the resultant product isolated in the manner described in Example 10A to give 6β,9α-dibromo-16α-ethyl-17α,21-dihydroxy-1,4-pregnadiene-3,11,20-trione 21-acetate.

C. *9α - bromo - 16α - ethyl - 17α,21 - dihydroxy - 1,5-pregnadiene - 3,11,20 - trione 21 - acetate.*—6β,9α-dibromo - 16α - ethyl - 17α,21 - dihydroxy - 1,4 - pregnadiene-3,11,20-trione 21-acetate (500 mg.) is dissolved in 10 ml. of tetrahydrofuran, and 4 g. of magnesium turnings added. This mixture is stirred at room temperature for one hour, then 25 ml. of 5% aqueous ammonium sulfate solution is added. This mixture is stirred another hour, then chloroform is added and the organic solvent layer is separated from the aqueous layer. The chloroform solution is concentrated in vacuo to yield 9α-bromo-16α - ethyl - 17α,21 - dihydroxy - 1,5 - pregnadiene - 3,11,20-trione 21-acetate.

D. *9α - bromo - 16α - ethyl - 17α,21 - dihydroxy - 1,5-pregnadiene - 3,11,20-trione.*—The 21-acetate of Example 35C is hydrolyzed to the corresponding 21-alcohol with the aid of a culture of *Flavobacterium dehydrogenans* to yield 9α - bromo - 16α - ethyl - 17α,21 - dihydroxy - 1,5-pregnadiene-3,11,20-trione.

We claim:

1. 1,5-pregnadienes having the following formula:

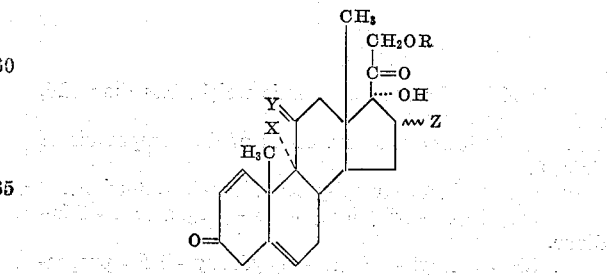

wherein X is a member of the group consisting of H and a halogen of atomic weight less than 126; Y is a member of the group consisting of O and (H,βOH); Z is a member of the group consisting of hydrogen and lower alkyl; and R is a member of the group consisting of H and lower alkanoyl.

2. 1,5-pregnadienes having the formula:

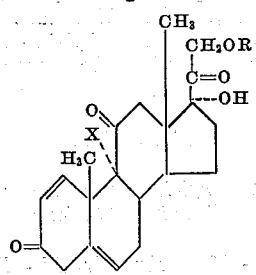

wherein X is a halogen of atomic weight less than 126.

3. The 21-lower alkanoyl esters of the compounds of claim 2.

4. 1,5-pregnadienes having the formula:

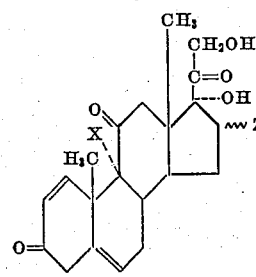

wherein X is a halogen of atomic weight less than 126 and Z is lower alkyl.

5. The 21-lower alkanoyl esters of the compounds of claim 4.

6. 1,5-pregnadienes having the formula:

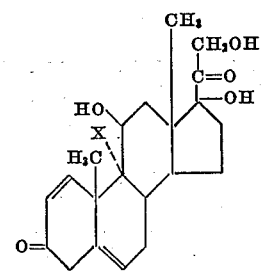

wherein X is a halogen of atomic weight less than 126.

7. The 21-lower alkanoyl esters of the compounds of claim 6.

8. 1,5-pregnadienes having the formula:

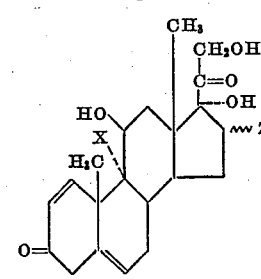

wherein X is a halogen of atomic weight less than 126, and Z is lower alkyl.

9. The 21-lower alkanoyl esters of the compounds of claim 8.

10. 17α,21-dihydroxy-1,5-pregnadiene-3,11,20-trione.

11. 11β,17α,21 - trihydroxy - 1,5 - pregnadiene - 3,20-dione.

12. 16α - methyl - 17α,21 - dihydroxy - 1,5 - pregnadiene-3,11,20-trione.

13. 16β - methyl - 17α,21 - dihydroxy - 1,5-pregnadiene-3,11,20-trione.

14. 16α - methyl - 11β,17α,21 - trihydroxy - 1,5 - pregnadiene-3,20-dione.

15. 16β - methyl - 11β,17α,21 - trihydroxy - 1,5 - pregnadiene-3,20-dione.

16. 9α - fluoro - 17α,21 - dihydroxy - 1,5 - pregnadiene-3,11,20-trione.

17. 9α - fluoro - 11β,17α,21 - trihydroxy - 1,5 - pregnadiene-3,20-dione.

18. 9α - fluoro - 16α - methyl - 17α,21 - dihydroxy-1,5-pregnadiene-3,11,20-trione.

19. 9α-fluoro-16β-methyl-17α,21-dihydroxy - 1,5 - pregnadiene-3,11,20-trione.

20. 9α-fluoro-16α-methyl-11β,17α,21 - trihydroxy - 1,5-pregnadiene-3,20-dione.

21. 9α-fluoro-16β-methyl - 11β,17α,21 - trihydroxy-1,5-pregnadiene-3,20-dione.

22. In the process for the manufacture of 3-keto-Δ^{1,5}-steroids the step which comprises reacting a 3-keto-Δ^{1,4}-steroid having also at the 6-position a member of the group consisting of halogen having an atomic weight greater than 19, lower alkanoyloxy, lower alkylsulfonyloxy, and phenylsulfonoyloxy with a metal reagent of the group consisting of zinc in a lower fatty alcohol, and magnesium in a solvent of the group consisting of tetrahydrofuran and lower dialkyl ethers.

23. In the process for the manufacture of a 3-keto-1,5-pregnadiene, the step which comprises reacting a 3-keto-6-bromo-1,4-pregnadiene with zinc in a lower fatty alcohol.

24. In the process for the manufacture of pregnadienes of the formula:

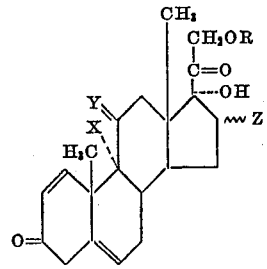

wherein X is a member of the group consisting of hydrogen and halogen having an atomic weight less than 126; Y is a member of the group consisting of O and (H,βOH); Z is a member of the group consisting of hydrogen and lower alkyl; and R is a member of the group consisting of H and lower alkanoyl; the step which comprises reacting a compound of the formula:

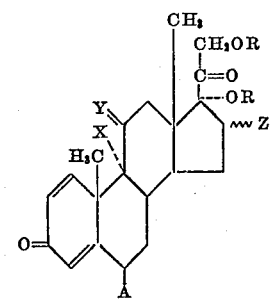

wherein X, Z and R are as defined above; Y is a member of the group consisting of O and (H,βOR); and A is a member of the group consisting of halogen having an atomic weight greater than 19, lower alkanoyloxy, lower alkylsulfonyloxy, and phenylsulfonyloxy; with a metal reagent of the group consisting of zinc in a lower fatty alcohol and magnesium in a solvent of the group consisting of tetrahydrofuran and lower dialkyl ethers, and isolating the 1,5-pregnadiene thereby formed.

25. The process of claim 24 including the step of hydrolyzing ester groups present in the 1,5-pregnadiene.

26. In the process for the manufacture of 17α,21-dihydroxy-1,5-pregnadiene-3,11,20-trione and the 21-acetate thereof, the step which comprises reacting 6α,17α,21-trihydroxy-1,4-pregnadiene-3,11,20-trione 6,21-diacetate with zinc in alcohol within a temperature range of about 50 to 100° C.

27. In the process for the manufacture of 11β,17α,21-trihydroxy-1,5-pregnadiene-3,20-dione and the 21-acetate thereof, the step which comprises reacting 6β,11β,17α,21-tetrahydroxy-1,4-pregnadiene-3,20-dione 6,21-diacetate with zinc in alcohol within a temperature range of about 50 to 100° C.

28. In the process for the manufacture of 16-methyl-17α,21-dihydroxy-1,5-pregnadiene-3,11,20-trione and the 21-acetate thereof, the step which comprises heating 16-methyl-6β,17α,21-trihydroxy-1,4-pregnadiene-3,11,20-trione 6,21-diacetate with zinc in alcohol within a temperature range of 50 to 100° C.

29. In the process for the manufacture of 16-methyl-11β,17α,21-trihydroxy-1,5-pregnadiene-3,20-dione and the 21-acetate thereof, the step which comprises heating 16-methyl-6β,11β,17α,21-tetrahydroxy-1,4-pregnadiene-3,20-dione 6,21-diacetate with zinc in alcohol within a temperature range of 50 to 100° C.

No references cited.

UNITED STATES PATENT OFFICE

Certificate of Correction

October 13, 1959

Patent No. 2,908,696

Alexander L. Nussbaum et al.

It is hereby certified that error appears in the printed specification of the above numbered patent requiring correction and that the said Letters Patent should read as corrected below.

Column 1, line 40, for "2-esters" read —21-esters—; column 4, lines 22 to 34, the structural formulae of Compounds II and III, should read as shown below instead of as in the patent:

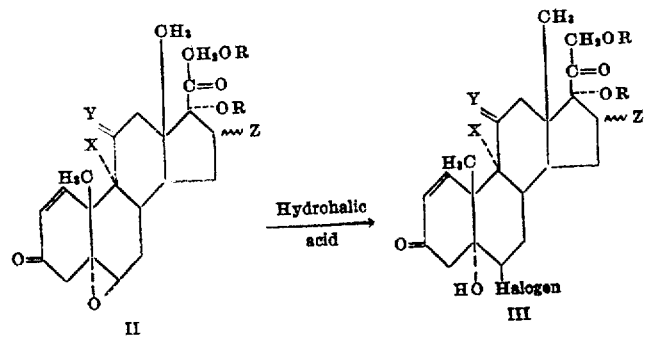

Signed and sealed this 7th day of June 1960.

[SEAL]

Attest:
KARL H. AXLINE,
*Attesting Officer.*

ROBERT C. WATSON,
*Commissioner of Patents.*